US009600494B2

(12) United States Patent
Maluf et al.

(10) Patent No.: US 9,600,494 B2
(45) Date of Patent: Mar. 21, 2017

(54) LINE RATE VISUAL ANALYTICS ON EDGE DEVICES

(71) Applicant: Cisco Technology, Inc., San Jose, CA (US)

(72) Inventors: David A. Maluf, Mountain View, CA (US); Raghuram S. Sudhaakar, Mountain View, CA (US); James D. Stanley, III, Austin, TX (US); Sateesh K. Addepalli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 408 days.

(21) Appl. No.: 14/163,169

(22) Filed: Jan. 24, 2014

(65) Prior Publication Data

US 2015/0213056 A1 Jul. 30, 2015

(51) Int. Cl.
*H04L 12/26* (2006.01)
*G06F 17/30* (2006.01)
(Continued)

(52) U.S. Cl.
CPC ........ *G06F 17/30247* (2013.01); *G06F 17/30* (2013.01); *G06F 17/30321* (2013.01);
(Continued)

(58) Field of Classification Search
CPC ........... G06F 17/3079; G06F 17/30811; G06F 17/30831
(Continued)

(56) References Cited

U.S. PATENT DOCUMENTS

| 2,006 A * | 3/1841 | Read | A43D 3/1416 |
| | | | 12/119.5 |
| 7,027,446 B2 * | 4/2006 | Rosenfeld | H04L 47/10 |
| | | | 370/235 |

(Continued)

FOREIGN PATENT DOCUMENTS

| EP | 1237374 A1 * | 9/2002 | ......... G06F 17/3079 |
| WO | WO 9850869 A1 * | 11/1998 | ......... G06F 17/3079 |
| WO | WO 2012/139240 A1 | 10/2012 | |

OTHER PUBLICATIONS

"Video Object Model and Segmentation for Content-Based Video Indexing" D. Zhong and S. F. Chang: Image and Advanced Television Laboratory Department of Electrical Engineering, Columbia University, New York, NY 10027, USA: 1997 IEEE International Symposium on Circuits and Systems, Jun. 9-12, 1997, Hong Kong.*

(Continued)

*Primary Examiner* — Khaled Kassim
*Assistant Examiner* — Berhanu Belete
(74) *Attorney, Agent, or Firm* — Parker Ibrahim & Berg LLC; James M. Behmke; Stephen D. LeBarron

(57) ABSTRACT

In one embodiment, a stream of data packets originated by a visual data source is received at an edge device in a network. The data packets include at least one of video data, image data, and geo spatial data. Next, a visual data attribute is extracted at the edge device from the stream of data packets according to an edge-based extraction algorithm. The extracted visual data attribute is vectorized at the edge device via quantization vectors. The vectorized visual data attribute is then indexed at the edge device in a schema-less database that stores indexed visual data attributes.

15 Claims, 7 Drawing Sheets

(51) Int. Cl.
*G06T 7/00* (2006.01)
*H04N 21/231* (2011.01)
*H04N 21/234* (2011.01)
*H04N 21/235* (2011.01)
*H04N 21/4728* (2011.01)

(52) U.S. Cl.
CPC ......... *G06T 7/0083* (2013.01); *H04N 21/235* (2013.01); *H04N 21/23109* (2013.01); *H04N 21/23418* (2013.01); *H04N 21/4728* (2013.01); *G06T 2210/12* (2013.01)

(58) Field of Classification Search
USPC ........................................................ 370/252
See application file for complete search history.

(56) References Cited

U.S. PATENT DOCUMENTS

| | | | | |
|---|---|---|---|---|
| 7,254,632 | B2* | 8/2007 | Zeira | G06F 17/30985 |
| | | | | 707/999.006 |
| 8,010,685 | B2* | 8/2011 | Singh | H04L 63/0245 |
| | | | | 709/229 |
| 8,359,068 | B1 | 1/2013 | Maluf | |
| 8,874,584 | B1* | 10/2014 | Chen | G06F 17/30805 |
| | | | | 707/741 |
| 2006/0209682 | A1* | 9/2006 | Filsfils | H04L 45/04 |
| | | | | 370/219 |
| 2007/0058842 | A1* | 3/2007 | Vallone | G06F 17/3079 |
| | | | | 382/115 |
| 2008/0082426 | A1* | 4/2008 | Gokturk | G06F 17/30256 |
| | | | | 705/26.62 |
| 2008/0144943 | A1* | 6/2008 | Gokturk | G06F 17/3025 |
| | | | | 382/224 |
| 2008/0152231 | A1* | 6/2008 | Gokturk | G06F 17/30256 |
| | | | | 382/209 |
| 2008/0177640 | A1* | 7/2008 | Gokturk | G06Q 30/02 |
| | | | | 705/26.62 |
| 2008/0212899 | A1* | 9/2008 | Gokturk | G06F 17/30259 |
| | | | | 382/305 |
| 2009/0103887 | A1 | 4/2009 | Choi et al. | |
| 2009/0249421 | A1* | 10/2009 | Liu | H04L 12/2801 |
| | | | | 725/116 |
| 2010/0293233 | A1* | 11/2010 | Salam | H04L 12/4641 |
| | | | | 709/206 |
| 2012/0226799 | A1* | 9/2012 | Kapur | G06F 9/5044 |
| | | | | 709/224 |
| 2013/0201986 | A1* | 8/2013 | Sajassi | H04L 45/48 |
| | | | | 370/390 |
| 2013/0212212 | A1* | 8/2013 | Addepalli | G06F 9/461 |
| | | | | 709/217 |

OTHER PUBLICATIONS

Jain, A. K., "Fundamentals of Digital Image Processing", 1989, pp. 150-154, Prentice Hall Publishing, New Jersey.
International Search Report issued Apr. 17, 2015 in connection with PCT/US2015/012373.

* cited by examiner

LINE RATE VISUAL ANALYTICS ON EDGE DEVICES

TECHNICAL FIELD

The present disclosure relates generally to computer networks, and, more particularly, to edge-based line rate visual analytics.

BACKGROUND

Persons in positions of authority or responsibility are often tasked with making important decisions based on available information, the impact of which potentially having far-reaching consequences. These so-called "decision makers" are increasingly in need of insights out of a deluge of the expanding amounts of connected devices, applications, and systems that generate a wide variety of data types from disparate sources and across different formats. As such, decision makers will seek out ways to "reduce time to insight," and big data clouds will continue to be inadequate for users and nodes that are spread out at the edge of communication networks. Although it is commonly believed that distributed and federated approaches to sensor-related data gathering will eventually transpire, the current approaches and prior work lack the capability to handle the performance requirements at both the system and human levels of edge networks when dealing with complex visual datasets.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
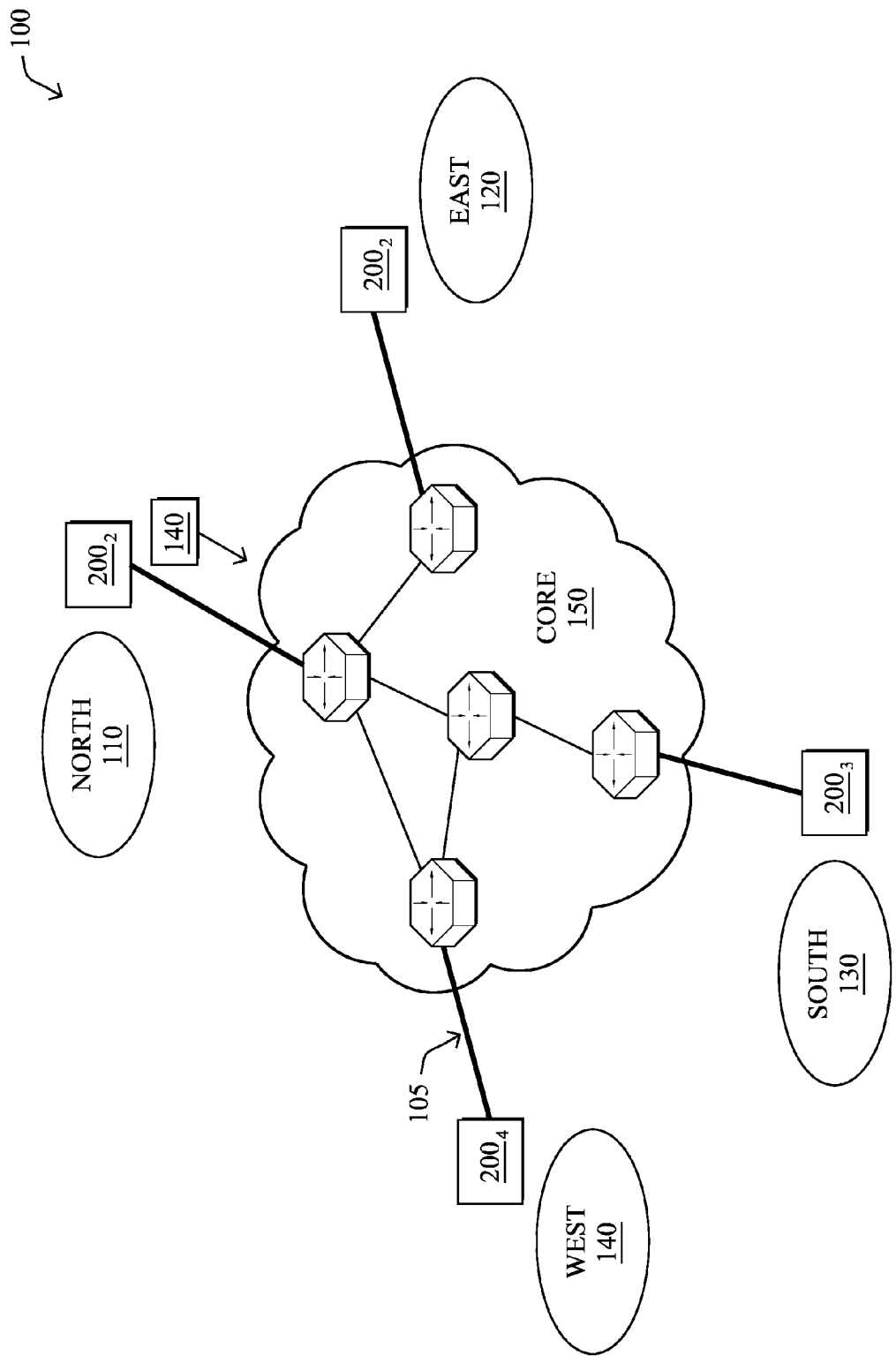
FIG. 1 illustrates an example communication network.

According to one or more embodiments of the disclosure, a stream of data packets originated by a visual data source is received at an edge device in a network. The data packets include at least one of video data, image data, and geospatial data. Next, a visual data attribute is extracted at the edge device from the stream of data packets according to an edge-based extraction algorithm. The extracted visual data attribute is vectorized at the edge device via quantization vectors. The vectorized visual data attribute is then indexed at the edge device in a schema-less database that stores indexed visual data attributes.

According to one or more additional embodiments of the disclosure, a search query identifying a visual data attribute to be searched is received. The visual data attribute to be searched is vectorized via quantization vectors. Then, a schema-less database that stores indexed visual data attributes is accessed. The indexed visual data attributes are indexed at one or more edge devices in a network. The indexed visual data attributes are searched for at least one candidate visual data attribute that is comparable to the vectorized visual data attribute to be searched, and then the at least one candidate visual data attribute that is comparable to the vectorized visual data attribute to be searched is determined.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 across multiple local area sites illustratively comprising edge nodes/devices 200 (e.g., labeled as $200_1$, $200_2$, $200_3$, and $200_4$, as described in FIG. 2 below) located at four (4) data sites denoted as North 110, East 120, South, 130 and West 140, respectively. Each data site may be a LAN, for example, that has WAN connectivity to each other LAN through a core provider network 150. One edge device 200 in one LAN may send data packets 140 to an edge device in another LAN via communication links 105 as though they were on the same LAN. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. To bridge the LANs, an edge device 200 that is part of a LAN may be coupled with the core network 150. Thus, the edge devices 200 are coupled to edge routers of core network 150. Each edge device 200 may act as a local proxy device within its respective LAN and may forward traffic into and out of the LAN across the core 150. Those skilled in the art will understand that any number of nodes, devices, links, etc. may be used in the computer network 100, and that the view shown herein is for simplicity.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
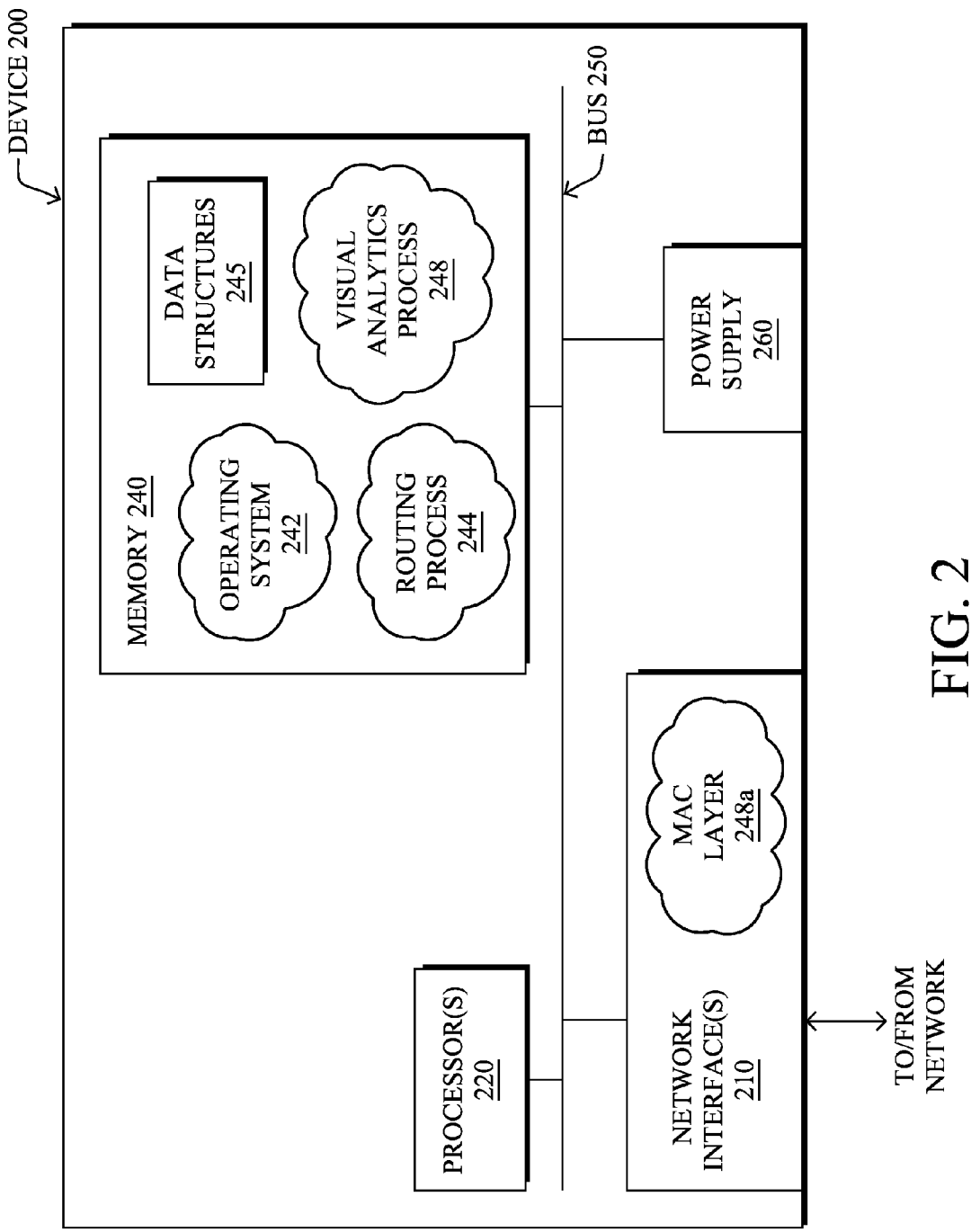
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device.

These software processes and/or services may comprise routing process/services 244 and an illustrative line rate visual analytics ("visual analytics") process 248, as described herein. Routing process (services) 244 contains computer executable instructions executed by the processor 220 to perform functions provided by one or more routing protocols, such as proactive or reactive routing protocols as will be understood by those skilled in the art. Note that while line rate visual analytics 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

A specific example implementation of the computer network 100 is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The IoT thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways.

With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been realized that IoT applications will consume and produce a wide variety of data types from different sources and across different formats. Image, video, and geospatial sources, for example, will exponentially represent a major percentage of the data on public and private networks in terms of volume, content, interest, and human context.

In order to be able to extract context specific content at a high granularity, the data needs to be processed very close to the source itself to address the performance needs of decision makers and the need to "reduce time to insight," rather than transferring the captured data to a centralized server for subsequent processing. Fortunately, edge nodes, e.g., IoT-capable routers, which are the devices in the network closest to the data sources, can assist in allowing edge work task to be performed in the field. Moreover, the edge devices/routers are typically intimately connected even when networks disconnect. For example, current high-definition (HD) cameras may be used to capture video data and then transmit the compressed video to the cloud where analytics on the captured video is performed. However, rather than transmitting the video data to a centralized location in the cloud, an alternative approach is to perform the analytics on the edge devices itself, or in other words, the HD camera.

Importantly, as is understood in the art, these devices are typically resource-constrained. Moreover, current edge-based technologies do not offer any efficient method to search through patterns that have occurred in the past, other than archived data. In fact, existing approaches lack edge indexes of patterns of visual information and sub-pixel metadata, which prevents dynamic ways to modulate policies based on planned and unplanned events, where a user can evaluate the indexes that capture more than the standard pre-defined downloaded datasets (e.g., six pre-defined fields versus 100 indexed unstructured attributes).

In addition, current video search techniques, e.g., as employed by internet search engines, typically classify images and associates text, e.g., tags, with them. The text is then used as the indexed field that links the image/video with the search query submitted by the user. Although this level of search is sufficient for human-computer interaction-use cases, it is insufficient for IoT-use cases because of the large volume of video data that needs to be handled and the lack of capability of data sources (usually sensors) to tag the video or image. As more and more edge devices, e.g., routers, come online, this lack of a distributed approach will hinder performance of systems and field personnel, in a time where reducing time to insight for a dispatched field worker is vital, especially if ever discounted in a forest, incident, peer-to-peer collaboration, or network incident.

Furthermore, Web Processing Services (WPS) and other geospatial servers handle the processing of geospatial datasets efficiently, yet do so typically as "data" embedded in the files, rather than via the visual elements of the images/video themselves; or if done on the images/videos themselves, it is done in comparison approaches on big centralized clouds, instead of on the edge. Geospatial datasets, which are typically used for urban planning, energy management, critical infrastructures, mapping restaurants, safety and security, incident response, earth science, and other important work flows, are very disaggregated, disparate, and hard to find. A gap exists currently in distributed meta information abstraction approaches and indexing of geospatial data at the edge independent of source, media or type (e.g., user device, machine-to-machine control device, edge image sensor, spatial visual sensors, such as LiDAR, individual geoservers, tile cache images that traverse networks, and the like).

Because geospatial data is typically intensive and complex, most analysis is handled at a central server or cloud, which faces similar limiting factors that video search and video analytics suffer from, such as network congestion, performance, context, etc. Geospatial data faces many different formats and standards, reducing sharing and productivity of users. Further, geospatial data is still in its early stages of evolution as a decision-support visual outside of scientist and geospatial developers. As a result, techniques relating to visual sub-pixel abstraction is conspicuously lacking for the geospatial industry.

As noted above, data abstraction and summarization, especially with respect to IoT implementations, is needed for decision makers who are trying to make sense of overwhelming amounts of visual data. It is more effective to deal with the abstracted data (e.g., extracted patterns) than the entire media stream itself. While a reference to the originating stream can be persistent, further reference to it derived from a centralized search will not be as efficient as instead providing a summarization of abstracted vectors derived from the originating image/video/geospatial stream. Visual line rate analytics at the edge thus adds value in decreasing time required for decision making, increasing edge performance, and optimizing the flow patterns of critical inefficient network pipes at the edge.

As such, understanding image/video/geospatial data is key component of IoT applications. This holds true for surveillance, consumer/professional video/images, environmental sensors, traffic/transportation, vehicles, UAVs, retail, supply chains, healthcare, and so forth. While existing and on-the-horizon approaches aim to conduct visual analytics in centralized big data clouds or servers, which is inefficient and unproductive, no solution currently exists for executing line rate visual analytics at the edge. Centralized analysis may miss what a field expert (e.g., "decision maker") searches for based on their own context and experience, as search of the indexes can be an important use case that validates uniqueness. Moreover, existing solutions to perform data understanding or to reduce time to insight at the edge are inefficient when incoming traffic needs to be matched against rich set of image patterns.

With respect to IoT devices, most devices at the edge have limited compute, storage, and memory. Thus, such devices are in need of "mini" or lightweight sub-pixel inspection and abstraction techniques. Also, in order to prevent clogging in the network providing real-time response times, the captured image/video/geospatial traffic should be terminated as close to the source as possible. This is critical for low bandwidth sensors, machines, and peer-to-peer situations at the edge. Moreover, due to edge devices being resource-constrained, it is necessary to streamline the performance requirements at the edge via unique distributed approaches to data interrogation, data inspection, and data indexing of visual data attributes via sub-pixel pattern abstraction and pattern matching of images, videos, and geospatial datasets.

Edge-Based Line Rate Visual Analytics

The techniques herein combine pattern extraction methods and algorithms integrated into edge-based processing, accompanied with a distributed indexing approach similar to routing look-up tables, yet for visual datasets. The techniques further provide visual pattern abstraction and visual sub-pixel identification at the edge, as well as geospatial visual data inspection at the edge.

Put another way, techniques herein provide methods and algorithms for: performing sub-pixel pattern extraction from image/video/geospatial understanding at a packet and stream level; sub-pixel pattern matching image/video/geospatial data extracted from a stream of packets against sets of patterns dynamically loaded onto the device or located remotely on a distributed network (e.g., a network that is node-based, rather than client/server-based or centralized data center-based); dynamically extracting various features of the visual packets/frames passing through an edge device, such as an IoT-enabled router; exchanging the features through a hierarchical network, whereby each device higher up in the hierarchy can coalesce the features and attributes based on programmable/dynamic optimization parameters; performing data extraction in an efficient manner that may leverage a multi-core router using additional cores for the image/video/geospatial pattern extraction and pattern matching concurrently; sub-pixel pattern extracting from image/video/geospatial/geospatial data streams using selective packet termination and selective caching of "frames of interest" at line rate in a visual stream; and image/video/geospatial meta-information abstraction and summarization from routers to the cloud where only minimal data is sent to the cloud, thereby optimizing network bandwidth and performance.

Specifically, according to one or more embodiments of the disclosure as described in detail below, a stream of data packets originated by a visual data source is received at an edge device in a network. The data packets include at least one of video data, image data, and geospatial data. Next, a visual data attribute is extracted at the edge device from the stream of data packets according to an edge-based extraction algorithm. The extracted visual data attribute is vectorized at the edge device via quantization vectors. The vectorized visual data attribute is then indexed at the edge device in a schema-less database that stores indexed visual data attributes. In one or more additional embodiments, a search query identifying a visual data attribute to be searched is received and the indexed visual data attributes are searched for at least one candidate visual data attribute that is comparable to the vectorized visual data attribute to be searched, and then the at least one candidate visual data attribute that is comparable to the vectorized visual data attribute to be searched is determined.

Illustratively, the techniques described herein may be performed by hardware, software, and/or firmware, such as in accordance with the "visual analytics" process 248/248a, which may contain computer executable instructions executed by the processor 220 (or independent processor of interfaces 210) to perform functions relating to the techniques described herein, e.g., in conjunction with routing process 244. For example, the techniques herein may be utilized as a key function in surveillance and monitoring analyzing image/video/geospatial streams at the edge. The techniques may thereby achieve ample scalability in image/video/geospatial surveillance abstraction and summarization by edge-based routers, where only minimal data is sent back to the cloud, thus optimizing bandwidth and performance.

Operationally, the disclosed embodiments include techniques for performing algorithmic pattern matching on visual, e.g., image/video/geospatial, datasets. Thus, visual pattern matching may be performed against pre-encoded queries, which allow for the offering of attribute-based search capabilities on image streams. These techniques may be executed in the visual space, and specifically, in the transform sub-space only, and according to a distributed methodology that occurs at edge routers, edge devices, edge sensors, edge machines, and, as appropriate, in distributed so-called "fog" nodes. In other words, visual data attributes may be extracted and pattern matched on the video stream in the transform space only.

Devices located at the edge of a communication network, e.g., routers, may operate as lightweight line rate mini-inspectors. The edge devices may execute code fine-tuned for edge computing to perform the quantization vector analysis and pattern matching. Such specialized edge computing may allow for scale and adaptation via small memory footprint on sensors, routers, and distributed edge node setups.

The edge devices may employ various calculation methods on "visual data," e.g., data including one or more of image data, video data, and geospatial data, including, for example, sub-pixel algorithmic inspection, pattern extraction, and pattern matching. The edge-based calculation methods take advantage of analytic geometry techniques that abstract image specification and attribute identifiers, which may categorize image or video packets via quantization vectors at the edge, as described in further detail below, in order to feed information into schema-less database indexes for the device itself or for distribution to an external location.

The schema-less database index may provide structured reference points for unstructured visual attributes, allowing for searchable indexes distributed across edge nodes. The searchable index may perform and act analogous to routing lookup tables, but only focused on visual attributes. That is, the schema-less index may employ a distributed meta-information abstraction approach to indexes for visual datasets.

Methods and structured policies may be controllable through distributed or centralized policy management programming and service calls by the so-called mini-inspectors. This may allow many policy approaches by users, administrators, third parties, and the like to identify items to target, track, trigger, etc. The methods or algorithmic-based policies established by the above entities may take advantage of the sub-pixel inspections, categorization, and edge indexing processes disclosed herein.

As explained above, the stream of data packets receive at an edge device in a network includes one or more of image data, visual data, and geospatial data. The geospatial data, in particular, may present unique challenges due, in part, to the complexity of the data. According to the present disclosure, an edge-based network packet view of visual sub-pixel analysis and indexing may be taken with respect to the geospatial data, rather than traditional geospatial analytics which typically involve tables/fields/spreadsheets within geospatial servers. Thus, as geospatial images, e.g., raster, radar images, vectors, etc., stream across the edge network nodes, the disclosed techniques may capture geospatial sub-pixel attributes and index composition at the resource-constrained edge devices themselves, unlike in current implementations.

In addition, patterns of geospatial datasets represent an emerging opportunity, especially for edge devices and location services. Cross-pattern indexing between visual attributes across visual types, e.g., image, video, and geospatial data, may produce unique cross-reference opportunities for various IoT-based decision support environments, ranging from the military to healthcare to urban planning.

Furthermore, visual indexing and pattern abstraction techniques, as disclosed herein, can be used for ensuring "veracity"- and "trust"-related attributes of source information for edge device visual datasets. This capability is critical for business and governments who will require added information and increased security levels for edge data sources. Therefore, users can obtain extended trust factors in IoT implementations.

Figure 3:
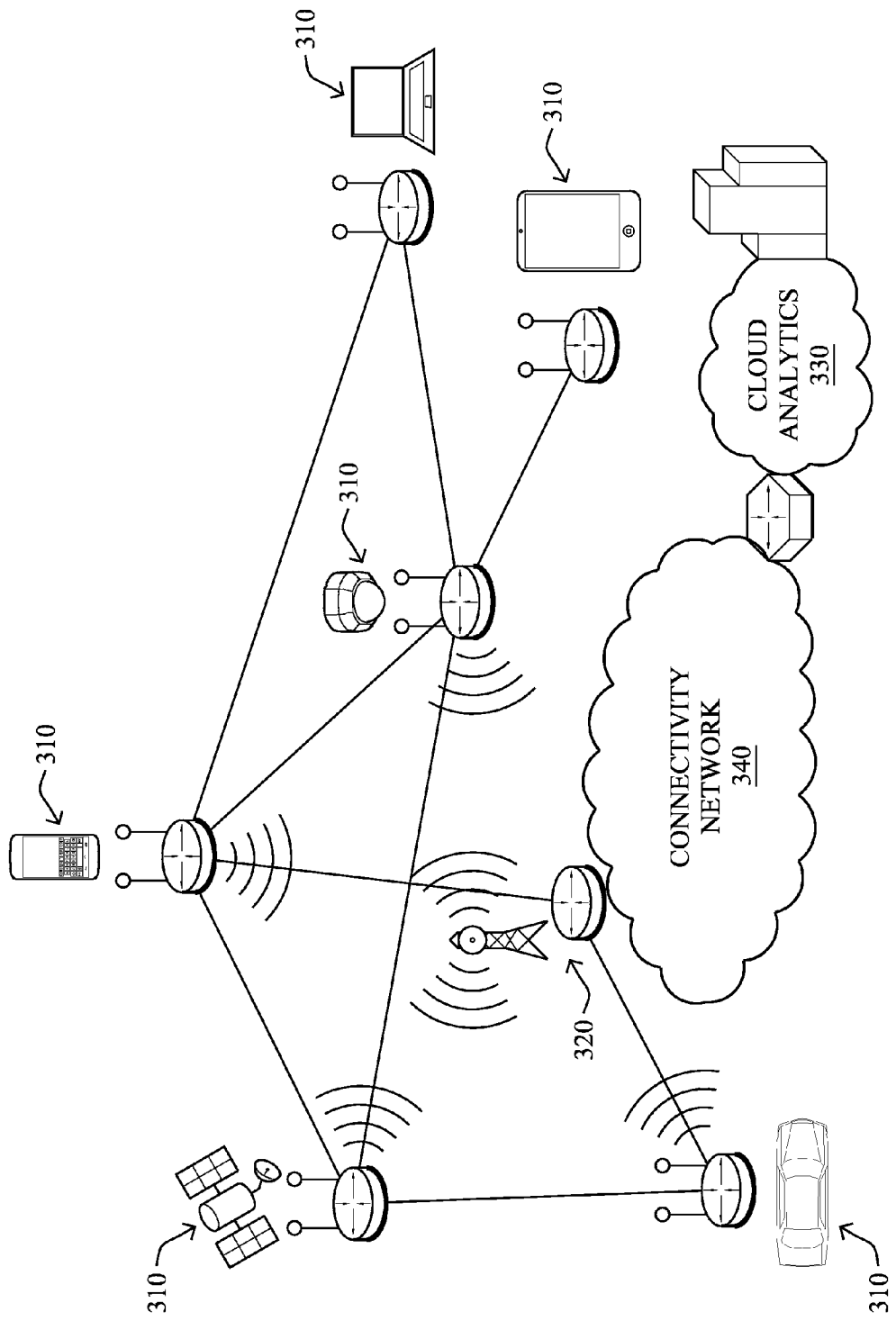
FIG. 3 illustrates an example edge-based line rate analytics implementation in a computer network.

FIG. 3 illustrates an example edge-based line rate analytics implementation in a computer network, that is, as an alternative view of network 100 with regard to visual data sources. In particular, as shown in FIG. 3, the computer network 300 includes a plurality of visual data sources 310 and may optionally include a centralized management node 320 and a centralized cloud analytics server 330.

The computer network 300 illustratively comprises a public network 340, such as the Internet. A plurality of visual data sources 310 may be connected to the public network 340 via a suitable communication link, as is known in the art. Further, the visual data sources 310 may be connected to a centralized management node 320 acting as a control center for the visual data sources, and a centralized cloud analytics server 330 to which image/video/geospatial data (e.g., "visual data") may optionally be sent for further analytics.

The visual data sources 310 may include a plurality of varied devices operable to capture and/or store visual data. For example, the visual data sources 310 may include one or more of a user's mobile device, an aircraft-enabled camera, a camera mounted in a law enforcement vehicle, geographic information system (GIS) map data, a video chat session (whereby images of interest may be captured in the background of the user's video feed), unmanned aerial vehicle (UAV) LiDAR data, and the like. Additionally, the visual data sources 310 could include edge devices such as gaming systems, where users experience a multimedia mashing of live game feeds, gameplay recording, video player chatting, image capture, and room-based image/video/human motion monitoring. It should be understood that the visual data sources 310 illustrated in FIG. 3 are merely for demonstration purposes, and the visual data sources may encompass any device suitable for capturing and/or storing visual data at the edge, allowing for indexing and searching, whether in public, private, or abstracted means. Notably, the visual data sources 310 may be implemented in any particular environment ranging from one's home to the public space, e.g., in the case of Smart Cities and the like.

Once a stream of data packets containing visual data, including one or more of image data, video data, and geospatial data, is captured at the visual data sources 310, which are illustratively located at the edge, the captured data is processed according to a variety of techniques, as described in further detail below. For example, a visual data attribute may be extracted at a visual data source 310, and the extracted attribute may undergo sub-pixel vectorization and indexing, including pattern matching, for example, at the visual data source. The extracted and vectorized visual data attribute may then be indexed/stored in an in-memory schema-less database. Access to the schema-less database, in which indexed visual data attributes are stored, may be distributed throughout the network 300. The schema-less database may operate as a lookup table, but in contrast to traditional lookup tables, is designed for indexing visual data. Then, pre-structure visual data may be transferred to the cloud, e.g., centralized cloud analytics server 330, for analysis based on predefined fields, e.g., databases.

Meanwhile, a user, administrator, third party, etc. may perform an unstructured search against the edge-located visual data sources 310 seeking a particular image, event, or sequence of images/events. The indexes as stored in the schema-less database may return one or more visual attributes across the disparate visual data sources 310 that may be comparable to the visual data attribute to be searched. Then, the user, administrator, third party, etc., e.g., "decision maker," may identify desired attributes and, optionally, modify policy engines to "track and record" visual data at a particular visual data source 310. Moreover, corresponding databases, e.g., postresSQL, may be modified to capture the desired visual attributes. Accordingly, the decision maker may be empowered to find visual elements of interest, whether stored at the edge or as a part of a real-time feed, and then automate the aggregation of that data into "decision support elements," thereby reducing overall time to insight.

Specific details regarding an example technical implementation of the disclosed embodiments are provided below.

1. Image Specification and Attribute Identification

Image specification and attribute identification components disclosed herein involve, for example, pattern extraction in the raw data stream space using vectorized indexes. Extracting patterns in the raw data stream space eliminates typical steps of conversion to pixel space and comparison with raw images/patterns, thus reducing CPU load. Also, an in-memory schema-less database may be created using a schema-less data management system that allows seamless merging of indexes and data on a router.

Figure 4:
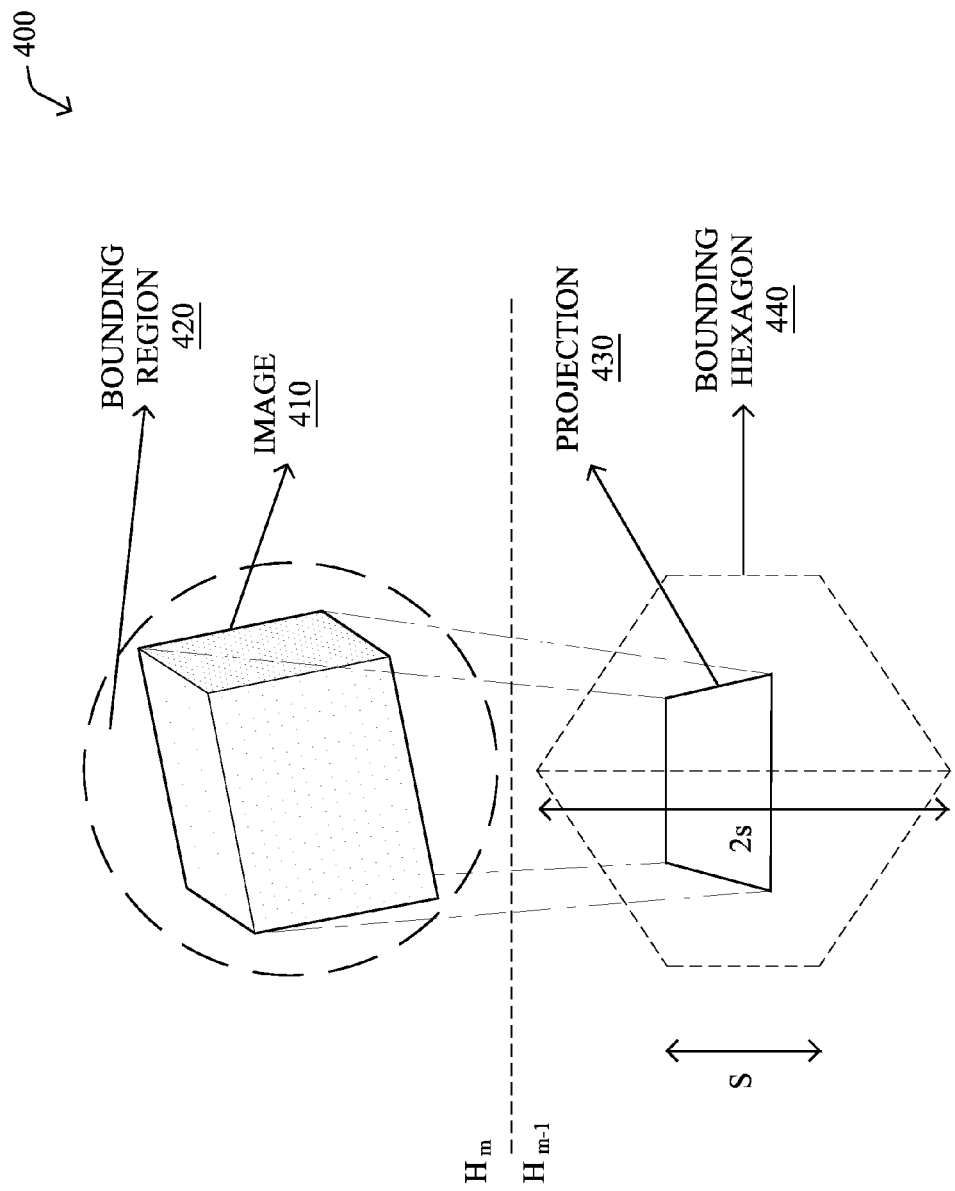
FIG. 4 illustrates an example image attribute extraction process.

FIG. 4 illustrates an example image attribute extraction process 400. Illustratively, the image 410 is a three-dimensional cube-like polygon but may be any particular image. The image 410 may be expressed in Q dimensions as a projection onto a hyperplane H of lower dimension, such as Q−1. For example, a photograph or sketch or line art in Q=3 dimensions may be expressed as a projection onto a two-dimensional surface (e.g., planar), with some artifacts included that suggest an arrangement (e.g., back to front) of image objects in spatial relationship with each other.

Using analytic geometry techniques, a hyperplane H=H$(q_1, \ldots, q_Q)$ may be represented as a vector components $(m_1, \ldots, m_Q)$ of a normal vector (e.g., perpendicular to the hyperplane H) and a normal distance $d_Q$ from the origin in Q-space to the hyperplane H. Accordingly, an arbitrary surface S may be projected, as in projection 430, onto the hyperplane H. The hyperplane H itself may be represented by Q=q+1 components; that is, q vector components plus one value representing the normal distance dQ from the coordinate origin to the hyperplane H.

The image 410 in the hyperplane H may have compact support, and thus have a limited or finitely bounded area or region R 420 in which the image 410, is located. As an example, an arbitrary image $I_m$ within a hyperplane H in Q=2 dimensions can be limited by a trapezoid, or by a plurality of trapezoids that fit together to form a bounding polygon for the image. Two trapezoids, each with horizontal lengths s and 2s, can be fitted together to form a bounding hexagon 440 with total area=$\{3\sqrt{2}/2)s^2$, which can be used to bound a circle of radius s.

An ellipse or oval can be similarly bounded with trapezoidal horizontal lengths $s_1$ and $s_2$ ($>2s_1$). For a general Q−1 dimensional trapezoid, the defining parameters may be estimated to be one or more of area values $A_1$ and $A_2$, vertical height or separation h of the areas, center point location coordinates (Q−1) of bottom line segment, and angular orientation of bottom line segment $(Q-1)_m$, which is a total of 3Q−1 parameters.

The complete image specification and attribute identification may thus include one or more of: an image plane (e.g., Q+1 parameters), 3Q−1 parameters defining a trapezoid or other bounding polyhedron within the image plane, and details of image content within each image plane. The image content can be specified approximately by (Q−1)K Fourier coefficients for an image within hyperplane H, where K is the number of coefficients used in a single dimension within H.

The schema-less database may be created using the above-mentioned parameters as fields. The database implementation may not require strict type specification and may accommodate combinations of text, integer, and binary data. The database or index may later be sent to other devices, e.g., IoT-compatible devices, to be processed using different optimization parameters. It can also be used to extract different sets of information in combination/correlation with other data.

Furthermore, pattern matching or search may be based on transforming a query from an originating image or video into the said quantization vectors. Then, an index lookup may be performed. This may allow indexed patterns in the discrete cosine transform (DCT) space to be searched. Queries on the index may be constructed to search for complex events and/or sequences of events using efficient schema-less database techniques. Moreover, a lightweight, run-time programmable rules engine may execute the pattern matching in a logic-based fashion. That is, the edge devices or "mini-inspectors" may allow for scale and adaptation via small memory footprint on sensors, routers, and special distributed edge node setups.

2. Line Rate Analytics of Visual Data

In the manner described above, image patterns to be recognized may be first converted to the set of above-mentioned parameters. An image lying in an image plane may effectively be decomposed into a collection of minimum representation units (MRUs) of sized $P_1 \times P_2 \times \ldots \times P_Q$ voxels (e.g., a Q-dimensional extension of pixels, corresponding to the choice of Q=2), preferably with the total volume of a single voxel, being a power of two. Even more preferably, each dimension of the MRU has the same size, $P_1=P_2=\ldots=P_Q$, whereby $P_2$ is a power of two, such as $P_1=4$, 8, 16, 32.

Amplitudes associated with each voxel in the image may be expressed in terms of (Q–1)-dimensional DCTs. The two-dimensional analog (Q=2) of DCT is known in the art and presented, for example, in A. K. Jain, Fundamentals of Digital Image Processing, Prentice Hall Publ., New Jersey, 1989, pp. 150-154.

The parameters along with the voxel amplitudes may be used to construct a query on the schema-less database to search for correspondingly similar images or patterns. The search queries can be constructed to search for multiple images and/or patterns occurring in a sequence to identify events.

Figure 5:
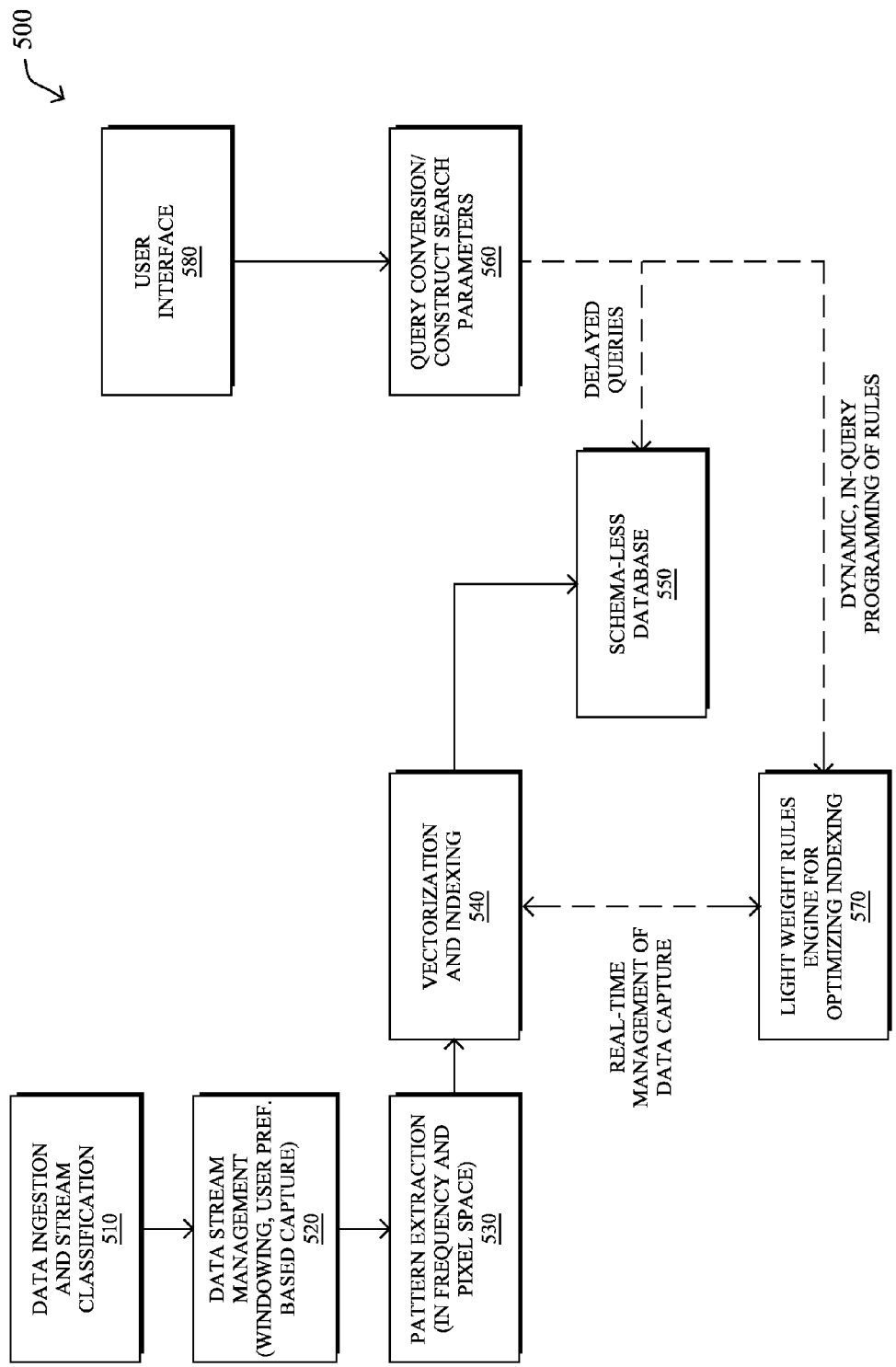
FIG. 5 illustrates an example packet flow system and process.

Along these lines, FIG. 5 illustrates an example packet flow system and process 500. As shown in FIG. 5, a component 510 may ingest an incoming stream of data packets originated by a visual data source, whereby the data packets include at least one of video data, image data, and geospatial data. This step may be performed in order to understand the application type and nature of the data media format and to select the appropriate format extraction logic.

A component 520 may perform data management of the packet payload, aggregating the data stream either as a complete stream or sliding window over the region of interest in a stream. Data extraction in long streams and infinite streams (e.g., video) may use the window of interest technique, for example.

A component 530 may perform a pattern extraction process over the data stream and image/video/geospatial data that leverages the native compression algorithm. The extracted pattern may otherwise be referred to as a visual data attribute from the stream of data packets, and the extraction may be performed according to an edge-based extraction algorithm. Pattern extraction algorithms may assume that the data stream follows typical compression algorithms and that the data admits a reversible solution (e.g., in the pixel sense). Also, the pattern extraction may not invert the data stream back into a pixel space but perform further transformation, including, for example, quantization (e.g., in constant CPU cost) over the compressed data.

A series of components (e.g., 540 through 570) may performs tasks in accordance with the techniques explained above (e.g., "Image Specification and Attribute Identification"). In this regard, a component 540 may vectorize selected (e.g., extracted) patterns and store those vectorized patterns in an index, such as the schema-less database that stores indexed visual data attributes.

A component 550 may create an in-memory schema-less database using a schema-less data management technique that allows for merging of index and data on a router. As a result, indexed patterns in the DCT space may be searched. The schema-less database, which stores indexed visual data attributes including at least one of video data, image data, and geospatial data, may be accessed in order for patterns or attributes to be searched. Further, the indexed visual data attributes may be indexed at one or more edge devices in the network.

A component 560 may construct queries to search for complex events and/or sequences of events using efficient schema-less database techniques. Further, pattern matching or search may executed by transforming the query from an originating image or video into the above-mentioned quantization vectors, and then performing an index lookup on the schema-less database. Based on the transformed query, the indexed visual data attributes in the schema-less database may be searched for at least one candidate visual data attribute that is comparable to the vectorized visual data attribute to be searched. Thus, the at least one candidate visual data attribute that is comparable to the vectorized visual data attribute to be searched may be determined.

A component 570 may manage a lightweight, run-time programmable rules engine used for executing the pattern matching in a logical fashion. Therefore, the edge devices may allow for scale and adaptation via small memory footprint on sensors, routers, and special distributed edge node setups.

A component 580 may provide a user interface by which a user, administrator, third party, and the like may input a search query identifying a visual data attribute to be searched including at least one of video data, image data, and geospatial data. The visual data attribute to be searched may be vectorized via quantization vectors, as explained above. The user interface may be accessed on any web-enabled or otherwise network-connected device, for example, and may constitute any suitable input means operable on such device.

Additionally, a component may achieve a degree of system learning by observing the patterns that are extracted and stored on the router. The component may function locally, e.g., in combination with another component, or remotely.

It should be understood that each of the components and the arrangement thereof depicted in FIG. 5 are shown for illustration purposes only. Each so-called component may merely represent a particular step in the line rate analytics process disclosed herein, or may constitute a particular physical component. Also, each component may operate independently of or in conjunction with the other components. The steps or techniques associated with each component may be performed in any particular order. Moreover, each of the steps or techniques associated with each component may be performed, and optimized for being performed, at a device located at the edge of a network, such as an IoT-compatible router.

The techniques explained above may be further utilized to contextualize the indexing and searching geospatial data. The geospatial data may be indexed and searched using geometry; for example, map data may use polygons to define the image data set that is to be presented to users. Thus, a user's search can be constructed in the domain of the polygon which may include parameters other than raw image attributes and features. These search parameters can be readily translated into a set of lower order searches on the image data set composing the polygon. The decomposition of the search parameters may be done using the same methods which use the extracted features and attributes from the image data, only in a different coordinate space. As a result, this method may handle varying degrees of complexity in search parameters, as is typical when dealing with geospatial data, and take advantage of recursive decomposition to construct a search on the indexed image data.

Figure 6:
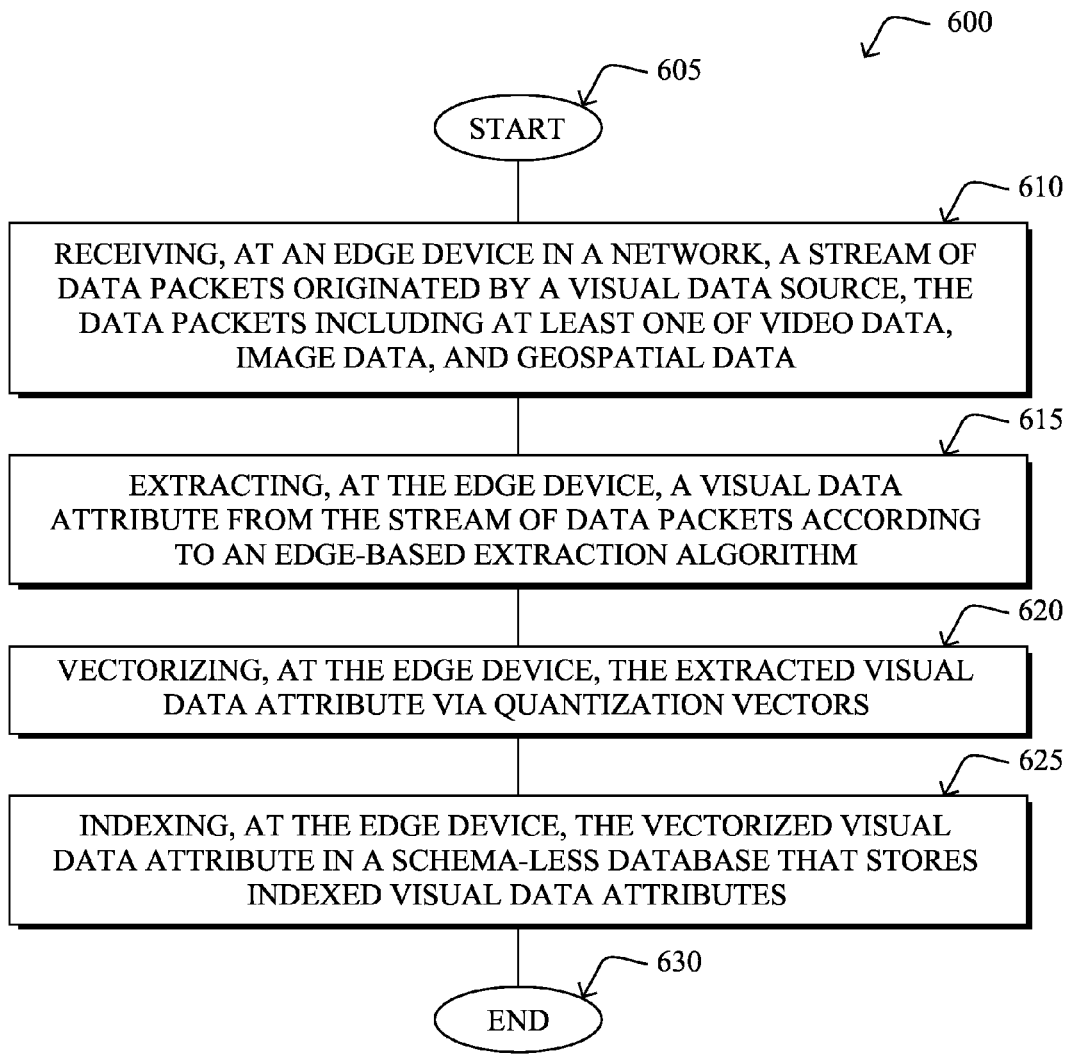
FIG. 6 illustrates an example simplified procedure for line rate visual analytics at an edge device.

FIG. 6 illustrates an example simplified procedure for line rate visual analytics at an edge device. The procedure 600 may start at step 605, and continues to step 610, where, as described in greater detail above, line rate analytics are performed at and optimized for edge devices.

At step 610, a stream of data packets originated by a visual data source is received. The data packets include at least one of video data, image data, and geospatial data. At step 615, a visual data attribute is extracted from the stream of data packets according to an edge-based extraction algorithm. At step 620, the extracted visual data attribute is vectorized via quantization vectors. At step 625, the vectorized visual data attribute is indexed in a schema-less database that stores indexed visual data attributes. Each of steps 610 through 625 may be performed at an edge device in a network. The procedure 600 illustratively ends at step 630.

Figure 7:
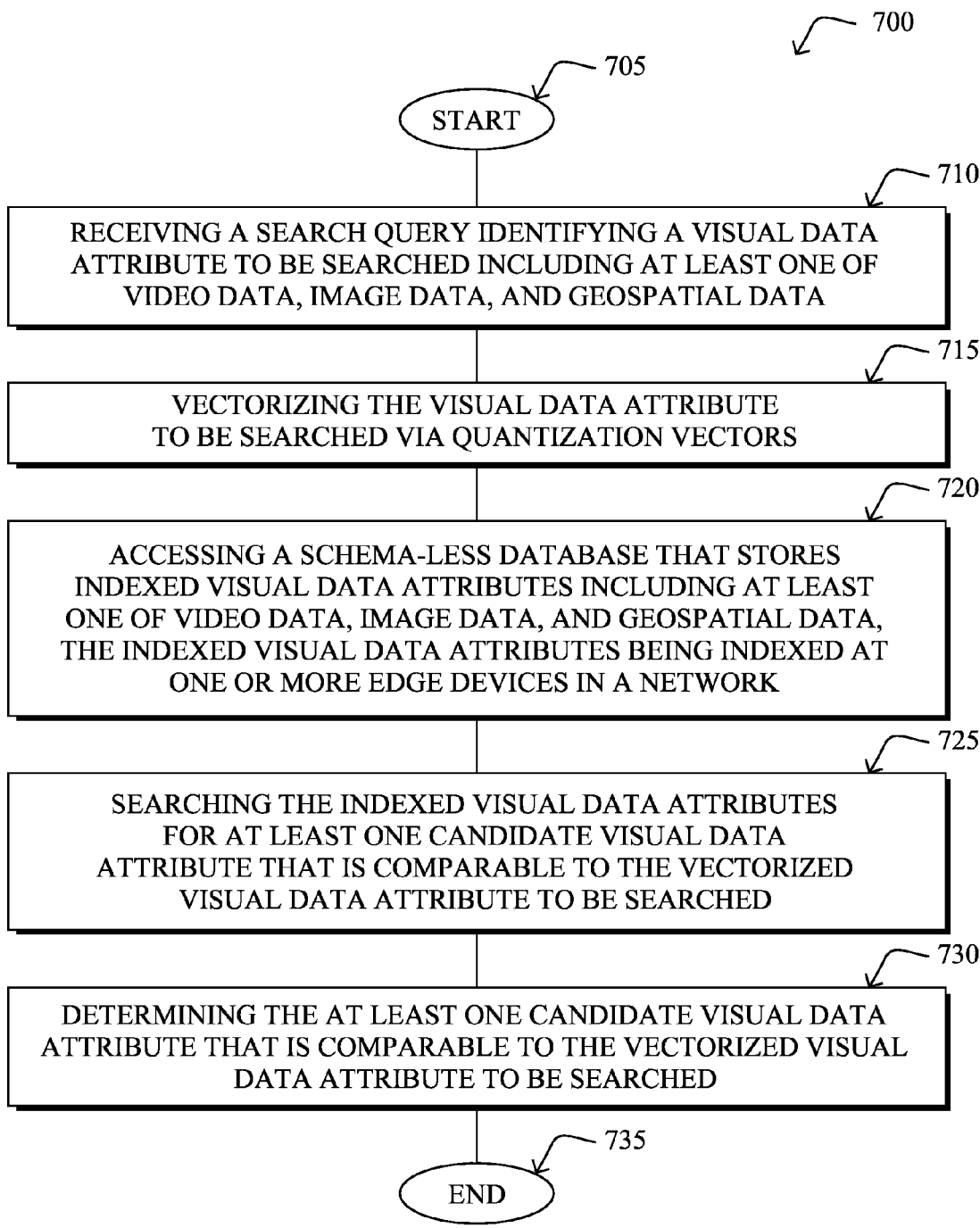
FIG. 7 illustrates an example simplified procedure for line rate visual analytics based on received search queries.

Additionally, FIG. 7 illustrates an example simplified procedure for line rate visual analytics based on received search queries. The procedure 700 may start at step 705, and continues to step 710, where, as described in greater detail above, a search query indicating a visual attribute to be searched may be transformed and the attribute may be searched against a schema-less database that stores indexed visual data attributes.

At step 710, a search query identifying a visual data attribute to be searched including at least one of video data, image data, and geospatial data is received. At step 715, the visual data attribute to be searched is vectorized via quantization vectors. At step 720, a schema-less database that stores indexed visual data attributes including at least one of video data, image data, and geospatial data is accessed. The indexed visual data attributes may be indexed at one or more edge devices in a network. At step 725, the indexed visual data attributes is searched for at least one candidate visual data attribute that is comparable to the vectorized visual data attribute to be searched. At step 730, the at least one candidate visual data attribute that is comparable to the vectorized visual data attribute to be searched is determined. The procedure 700 illustratively ends at step 735.

The techniques by which the steps of procedures 600 and 700 may be performed, as well as ancillary procedures and parameters, are described in detail above. It should be noted that certain steps within procedures 600 and 700 may be optional, and the steps shown in FIGS. 6 and 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600 and 700 are described separately, certain steps from each procedure may be incorporated into each other procedure, and the procedures are not meant to be mutually exclusive.

The techniques described herein, therefore, provide for efficient edge-based line rate analytics (e.g., which may merely consume about 200 KB of static memory). These techniques allow for real-time pattern extraction and search on the indexed data. Thus, image and event identification is considerably faster as large volumes of video data need not be exchanged between cloud and server. Moreover, the techniques offer significant scalability over cloud-based mechanisms, as the traffic between cloud and edge devices may be limited to search queries and responses. Further, the ability to structure indexes and implement schema-less approaches at the edge for visual datasets that include images, video, and geospatial maps and visuals helps to "reduce time to insight" for the deluge of visual data available at the edge. Smart object network administrators may benefit in "fog"-like edge processing, yet with a distributed schema less indexing of visual indexes across many distributed nodes at the edge through to the core.

While there have been shown and described illustrative embodiments that provide for edge-based line rate visual analytics, it is to be understood that various other adaptations and modifications may be made within the spirit and scope of the embodiments herein. For example, the embodiments have been shown and described herein with relation to smart object networks, and particularly the IoT. However, the embodiments in their broader sense are not as limited, and may, in fact, be implemented within other types of networks. In addition, while certain algorithmic equations are shown above, the embodiments in their broader sense are not as limited, and may, in fact, be modified within the spirit of the disclosure and the scope of the claims recited herein, as would be understood by a person of ordinary skill in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at an edge device in a network, a stream of data packets originated by a visual data source, the data packets including at least one of video data, image data, and geospatial data, wherein the edge device acts as a local proxy device within its respective local area network (LAN) between the network and a core network to forward data packets into and out of the network;
    extracting, at the edge device, a visual data attribute from the stream of data packets;
    vectorizing, at the edge device, the extracted visual data attribute via quantization vectors;
    indexing, at the edge device, the vectorized visual data attribute in a schema-less database that stores indexed visual data attributes;
    receiving, at the edge device, a search query including a vectorized visual data attribute to be searched; and
    searching, at the edge device, the indexed visual data attributes for at least one candidate visual data attribute comparable to the vectorized visual data attribute to be searched.

2. The method as in claim 1, further comprising:
    defining a region of interest in the stream of data packets, wherein the extracted visual data attribute is extracted from the region of interest.

3. The method as in claim 1, further comprising:
    determining whether the stream of data packets includes video data, image data, or geospatial data, wherein the extracting at the edge device is based on the determination.

4. The method as in claim 1, further comprising:
    determining the visual data source by which the stream of data packets is originated, wherein the extracting at the edge device is based on the determination.

5. The method as in claim 1, further comprising:
compressing the stream of data packets; and
placing the compressed stream of data packets in a visual data container.

6. The method as in claim 1, wherein the extracting of the visual data attribute comprises:
projecting an object in Q dimensions onto an object plane with Q-1 dimensions;
calculating a bounding region on the object plane in which the projected object is located, wherein the bounding region is defined by at least one bounding parameter.

7. The method as in claim 6, wherein the at least one bounding parameter includes at least one of a first and second area value, a separation amount of the first and second area value, a center point of a line segment, and an angular orientation of the line segment.

8. The method as in claim 1, wherein the extracting of the visual data attribute is performed in a transform space.

9. The method as in claim 1, further comprising:
creating the schema-less database using at least one bounding parameter as a field.

10. The method as in claim 1, further comprising:
providing access to the schema-less database to at least one other edge device in the network.

11. The method as in claim 1, further comprising:
identifying visual data trends based on the extracted visual data attribute; and
storing the extracted visual data attribute at a storage location.

12. An apparatus, comprising:
one or more network interfaces that communicate with a network;
a processor coupled to the one or more network interfaces and configured to execute a process; and
a memory configured to store program instructions which contain the process executable by the processor, the process comprising:
receiving, as an edge device in the network, a stream of data packets originated by a visual data source, the data packets including at least one of video data, image data, and geospatial data, wherein the edge device acts as a local proxy device within its respective local area network (LAN) between the network and a core network to forward data packets into and out of the network:
extracting, as the edge device, a visual data attribute from the stream of data packets;
vectorizing, as the edge device, the extracted visual data attribute via quantization vectors;
indexing, as the edge device, the vectorized visual data attribute in a schema-less database that stores indexed visual data attributes;
receiving, as the edge device, a search query including a vectorized visual data attribute to be searched; and
searching, as the edge device, the indexed visual data attributes for at least one candidate visual data attribute comparable to the vectorized visual data attribute to be searched.

13. The apparatus as in claim 12, wherein the process further comprises:
defining a region of interest in the stream of data packets, wherein the extracted visual data attribute is extracted from the region of interest.

14. The apparatus as in claim 12, wherein the process further comprises:
determining whether the stream of data packets includes video data, image data, or geospatial data, wherein the extracting at the edge device is based on the determination.

15. A tangible, non-transitory, computer-readable media having software encoded thereon, the software when executed by a processor operable to:
receive, as an edge device in the network, a stream of data packets originated by a visual data source, the data packets including at least one of video data, image data, and geospatial data, wherein the edge device acts as a local proxy device within its respective local area network (LAN) between the network and a core network to forward data packets into and out of the network;
extract, as the edge device, a visual data attribute from the stream of data packets;
vectorize, as the edge device, the extracted visual data attribute via quantization vectors;
index, as the edge device, the vectorized visual data attribute in a schema-less database that stores indexed visual data attributes;
receive, as the edge device, a search query including a vectorized visual data attribute to be searched; and
searching, as the edge device, the indexed visual data attributes for at least one candidate visual data attribute comparable to the vectorized visual data attribute to be searched.

* * * * *